United States Patent
Branover et al.

(10) Patent No.: US 7,941,683 B2
(45) Date of Patent: May 10, 2011

(54) DATA PROCESSING DEVICE WITH LOW-POWER CACHE ACCESS MODE

(75) Inventors: Alex Branover, Brookline, MA (US); Frank P. Helms, Austin, TX (US); Maurice Steinman, Marlborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 986 days.

(21) Appl. No.: 11/743,388

(22) Filed: May 2, 2007

(65) Prior Publication Data

US 2008/0276236 A1 Nov. 6, 2008

(51) Int. Cl.
*G06F 1/00* (2006.01)
(52) U.S. Cl. .......................................... 713/323; 713/320
(58) Field of Classification Search .................. 713/300, 713/320
See application file for complete search history.

(56) References Cited

U.S. PATENT DOCUMENTS

| | | | | |
|---|---|---|---|---|
| 6,118,306 A * | 9/2000 | Orton et al. | ...................... | 327/44 |
| 6,795,896 B1 * | 9/2004 | Hart et al. | ...................... | 711/118 |
| 6,988,211 B2 * | 1/2006 | Cline et al. | ..................... | 713/300 |
| 7,337,335 B2 * | 2/2008 | Jorgenson et al. | ............ | 713/300 |
| 7,664,970 B2 * | 2/2010 | Jahagirdar et al. | ............ | 713/300 |
| 2003/0204760 A1 * | 10/2003 | Youngs | ........................ | 713/320 |
| 2004/0255176 A1 | 12/2004 | Varghese et al. | | |

OTHER PUBLICATIONS

International Search Report for PCT/US2008/005692 dated May 25, 2009, 14 pages.

* cited by examiner

*Primary Examiner* — Chun Cao (57) ABSTRACT

A processor can operate in three different modes. In an active mode, a first voltage is provided to the processor, where the first voltage is sufficient to allow the processor to execute instructions. In a low-power mode, a retention voltage is provided to the processor. The processor consumes less power in the retention mode than in the active mode. In addition, the processor can operate in a third mode, where a voltage is provided to the processor sufficient to allow the processor to process cache messages, such as coherency messages, but not execute other normal operations or perform normal operations at a very low speed relative to their performance in the active mode.

20 Claims, 5 Drawing Sheets

DATA PROCESSING DEVICE WITH LOW-POWER CACHE ACCESS MODE

FIELD OF THE DISCLOSURE

The present disclosure relates to processors and more particularly to processors that process cache transactions in multiple modes.

BACKGROUND

Some processors can operate in multiple modes, such as an active mode and a low power or sleep mode. In an active mode, a voltage regulator provides a voltage to the processor that allows the processor to execute instructions and perform normal operations. In the low power mode, the voltage regulator provides a retention voltage to the processor that allows the processor to retain its internal state, but not execute instructions or other normal operations. The retention voltage is lower than the voltage provided in the active mode, thereby allowing the processor to conserve power. The processor can enter the low power mode to conserve power but retain its internal state so that when it returns to the active mode it is able to continue operations from the state it had prior to entering the low power mode.

Some processors can support a coherent memory space or allow other modules of a device to access the processor cache. In order to perform cache transactions to maintain coherency or to service access requests from other modules received while the processor is in low-power mode, conventional processors switch from the low-power mode to the active mode. However, due to physical characteristics of the voltage regulator, the processor cannot quickly change from the low power mode to the active mode. Thus, conventional processors typically enter the low-power mode less frequently as more cache transaction requests are received, and therefore are in the low power mode less often. This can result in an undesirable consumption of power by the processor. Accordingly, there is a need for a new processing device and methods.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A processor that can operate in three different modes is disclosed. In an active mode, a first voltage (referred to herein as an "active voltage") is provided to the processor, where the first voltage is sufficient to allow the processor to execute instructions. In a low-power mode, a retention voltage is provided to the processor, where the retention voltage is insufficient for the processor to execute instructions, but is sufficient to allow the processor to retain state information stored prior to entering the low-power mode. The processor consumes less power in the retention mode than in the active mode. In addition, the processor can operate in a third mode, referred to herein as a cache-transaction processing mode, where a voltage (referred to herein as a "cache-transaction processing voltage") is provided to the processor, where the cache-transaction processing voltage is sufficient to allow the processor to process cache messages, such as coherency messages, but not execute other normal operations or perform normal operations at a very low speed relative to their performance in the active mode. The voltage provided to the processor in the cache-transaction processing mode is lower than the voltage in the active mode and higher than the voltage in the retention mode.

If the processor is to perform a cache transaction when it is in the low power mode, it enters the cache-transaction processing mode and processes the cache transaction. Once processing of the cache transaction is complete, the processor returns to the low-power mode. Because there is a relatively small voltage difference between the retention voltage provided in the low-power mode and the cache-transaction processing voltage provided to the processor in the cache-transaction processing mode (as compared to the voltage difference between the retention voltage and the active voltage), the processor is able to more rapidly transition between the low-power mode and the cache-transaction processing mode (as compared to the transition from the low power mode to the active mode), thereby allowing the processor to remain in the low-power mode for a longer period of time and reducing power consumption of the processor.

Figure 1:
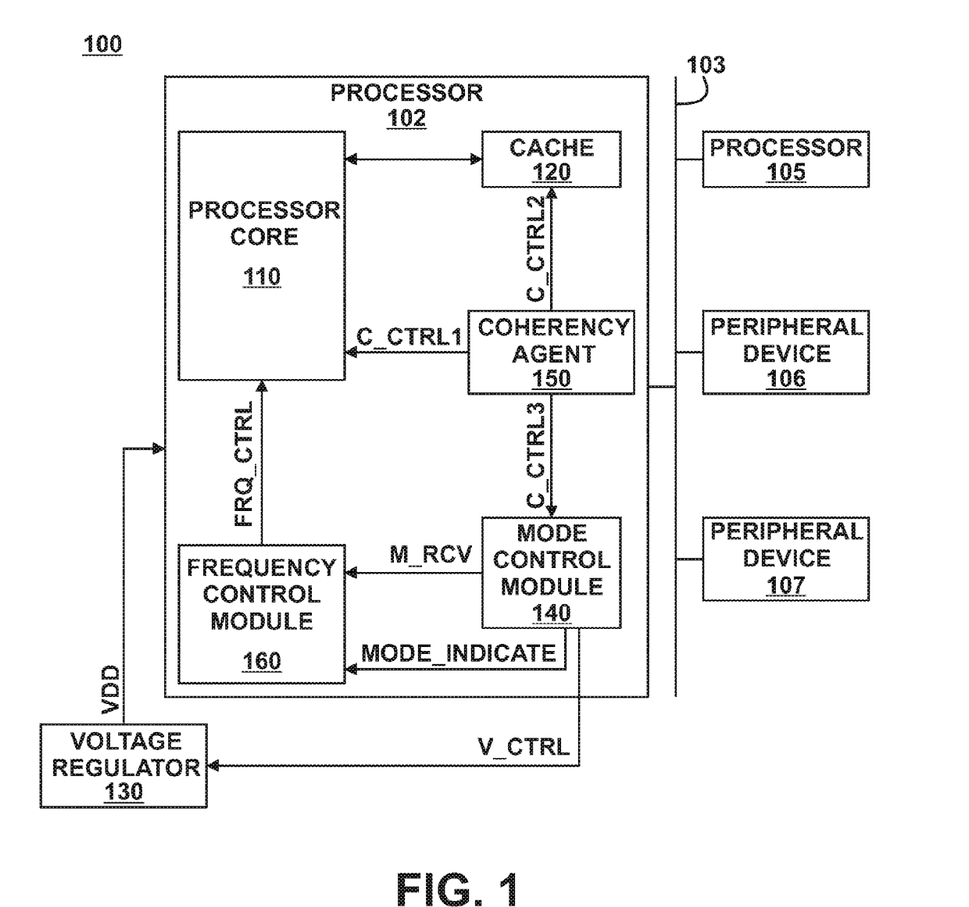
FIG. 1 is a block diagram of a particular embodiment of a device incorporating a processor having multiple operating modes.

Referring to FIG. 1, a block diagram of a system 100 is disclosed. The system 100 includes a processor 102, a bus 103, a processor 105, a peripheral device 106, a peripheral device 107, and a voltage regulator 130. The processor 102, processor 105, and peripheral devices 106 and 107 are each connected to the bus 103. The processor 102 includes an output to provide a signal, labeled V_CTRL, to an input of the voltage regulator 130. In addition, the processor 102 includes an input to receive an adjustable voltage, labeled VDD, from an output of the voltage regulator 130.

The processor 102 and the processor 105 can each be a microprocessor, microcontroller, an application specific integrated circuit (ASIC), and the like. The peripheral devices 106 and 107 can each be a memory controller, input/output controller, peripheral controller, and the like. In addition, each of the illustrated portions of the system 100 can be integrated on a common semiconductor substrate, or be located on different substrates. For example, the processor 102 and the processor 105 can be integrated on a common semiconductor substrate, with the peripheral devices 106 and 107 located external to that semiconductor substrate. In the illustrated embodiment, the voltage regulator 130 is located external to the processor 102. In other embodiments, the voltage regulator 130 can be implemented internal to the processor 102.

During operation, the processor 102 can operate in an active mode, a low-power mode, and a cache-transaction processing mode. In the active mode, the processor 102 can execute instructions and perform other normal operations. In the low-power mode, the processor 102 is placed in a retention state, so that the state of the processor 102 is retained. In the low-power mode the processor 102 cannot execute instructions or perform other normal operations. In the cache-transaction processing mode, the processor 102 is able to process cache messages provided by the processor 105 and the peripheral devices 106 and 107 via the bus 103. The cache messages represent requests for the processor 102 to process cache transactions, such as coherency transactions or access transactions. The processor 102 processes the cache message by analyzing the cache message and, when appropriate, performing the requested cache transaction.

The voltage regulator 130 provides a different level of the operating voltage VDD for each of the three modes of the processor 102. In the active mode, the operating voltage VDD is set to the active voltage level to allow the processor 102 to execute instructions. In the cache-transaction processing mode, the operating voltage VDD is set to the cache-transaction processing voltage level, which is lower than the active voltage level. This voltage level allows the processor 102 to process cache messages, but not perform other normal operations or perform other normal operations only at a low speed relative to performance of normal operations in the active mode. In the low-power mode, the operating voltage VDD is set to a retention voltage, so that the processor 102 is able to retain state information but cannot execute instructions. The retention voltage is lower than the cache-transaction processing voltage. In a particular embodiment, the retention voltage is about 0.7 volts, the cache-transaction processing voltage is between about 0.75 and about 0.8 volts, and the active voltage is about 1.1 volts.

The level of the voltage VDD is controlled by the signal V_CTRL. Accordingly, when the processor 102 enters a new mode, it configures the voltage regulator 130 to set the voltage VDD to the appropriate level for the new mode using the signal V_CTRL.

The processor 102 can change modes depending on different factors. For example, the processor 102 can change from the active mode to the low-power mode after a predetermined period of time where no user input to the system 100 has been received. In the low-power mode, the processor 102 can still receive cache messages from the processor 105 or the peripheral devices 106 and 107. Examples of cache messages that can cause the processor 102 to enter cache-transaction processing mode can include cache probe or cache read messages (e.g. messages to check if a cache location contains modified data), cache invalidate messages (e.g. messages indicating that a particular cache line should be invalidated because data associated with that cache line has been modified by one of the peripheral devices 106 and 107 or by the processor 105), and cache write messages (e.g. messages that allow the peripheral devices 106 and 107 and the processor 105 to write directly to the cache). In response to receiving the cache message, the processor 102 can enter the cache-transaction processing mode, process the cache message, and return to the low-power mode upon completion of processing. Because the processor 102 does not have to enter the active mode to process the cache message, it is able to return to the low-power mode more quickly, thereby conserving power.

The processor 102 includes a processor core 110, a cache 120, a mode control module 140, a coherency agent 150, and a frequency control module 160. The processor core 110 includes a bi-directional connection to the cache 120. The processor core 110 also includes an input to receive a signal FRQ_CTRL and an input to receive a signal C_CTRL1. The cache 120 includes an input to receive a signal C_CTRL2. The coherency agent includes outputs to provide control signals C_CTRL1, C_CTRL2, and C_CTRL3. The mode control module 140 includes an input to receive the signal C_CTRL3, an output to provide the signal V_CTRL, an output to provide the signal MODE_INDICATOR, and an output to provide the signal M_RCV. The frequency control module 160 includes an input to receive the signal M_RCV and an output to provide the signal FRQ_CTRL.

The processor core 110 is configured to executes instructions in the active mode, and perform other operations, such as processing cache messages in the active mode and the cache-transaction processing mode. The processor core 110 is also configured to provide access requests and coherency information to the cache 120.

The cache 120 is configured to provide and store data in response to requests provided by the processor core 110 or information provided via the signal C_CTRL2. The cache 120 also maintains coherency information for its stored data, and can modify that coherency information based on requests from the processor core 110 or information provided via the signal C_CTRL2.

The coherency agent 150 is configured to receive cache messages, represent cache transaction requests, via the bus 103 from the processor 105 and the peripheral devices 106 and 107. The cache messages can represent coherency transactions or cache access requests from the processor 105 and the peripheral devices 106 and 107. The coherency agent 150 provides information about the received cache messages via the signals C_CTRL1, C_CTRL2, and C_CTRL3.

The mode control module 140 is configured to receive information about received cache messages 140 and is configured to control the mode of operation of the processor 102. To control the mode of operation, the mode control module 140 provides information via the V_CTRL signal to set the operating voltage VDD, information via the MODE_INDICATOR signal to set the clock frequency for the processor core 110 in each mode of operation, and information via the M_RCV signal to indicate that a cache message has been received.

The frequency control module 160 is configured to receive information via the M_RCV signal indicating that a cache message has been received, and information via the MODE_INDICATOR signal indicating the mode of operation for the processor 102. The frequency control module 106 is configured to provide information via the FRQ_CTRL signal to set the clock frequency of the processor core 110 depending on the mode of operation for the processor 102. The frequency control module 160 is further configured to determine the number of cache messages received in a defined period of time and, based on this determination, provide information via the FRQ_CTRL signal to change the clock frequency of the processor core 110 in the cache-transaction processing mode.

During operation, in the active mode the processor core 110 executes instructions to perform tasks of the processor 102. The coherency agent 150 ensures that the cache 120 remains coherent with other memory of the system 100, such as a cache of the processor 105 (not shown) or memory controlled by one of the peripheral devices 106 and 107. The coherency agent 150 receives cache messages, such as coherency messages, via the bus 103. Based on the received cache messages, the coherency agent 150 provides coherency information to the processor core 110 and the cache 120 via the signals C_CTRL1 and C_CTRL1, respectively.

For example, in response to receiving a cache message indicating that data associated with a memory address has been modified by the processor 105, the coherency agent 150 notifies the processor core 110 and the cache 120 of the modification. In response, the processor core 110 and the cache 120 determine if the cache 120 stores data associated with that memory address and, if so, take appropriate action such as invalidating the cache line.

The mode control module 140 controls the operational mode of the processor 102 depending on the operating conditions of the system 100 and other factors. For example, the mode control module 140 can change the mode of operation from the active mode to the low-power mode if there has not been a user input to the system 100 in a defined amount of time, if there has been no bus activity for a defined amount of time, or if an operating system or other software executing at the processor 102 or the processor 105 directs the processor 102 to enter the low-power mode. The mode control module 140 can also change the mode of operation from the low-power mode to the active mode in response to a user input or interrupt being received. To change the mode of operation, the mode control module 140 provides the signal V_CTRL to the voltage regulator to change the operating voltage VDD for the processor 102. In addition, the mode control module 140 indicates the mode of operation to the frequency control module 160 via the signal MODE_INDICATOR to set the clock frequency for the processor core 110 in each mode.

In response to receiving a coherency message, the coherency agent 150 notifies the mode control module 140 via the signal C_CTRL3. In response, if the processor 102 is in the low-power mode, the mode control module 140 changes the mode of operation to the cache-transaction processing mode. The mode control module 140 provides the signal V,CTRL to set the operating voltage VDD to the appropriate level so that the processor 102 can process the cache message. In addition, the mode control module 140 notifies the frequency control module 160 that a cache message has been received. Once the processor core 110 has completed processing the cache message, the mode control module 140 returns the processor 102 to the low-power mode, including changing the level of the operating voltage VDD, thereby conserving power.

In an alternative embodiment, the mode control module 140 may change the mode of operation of the processor 102 only after a threshold number of cache messages have been received. In this case, the mode control module 140 returns the processor to the low-power mode once all pending cache messages have been processed.

The frequency control module 160 sets the clock frequency for the processor core 110 based on the MODE_INDICATOR signal. In a particular embodiment, the clock frequency is set to about zero in the low-power mode, and in the cache-transaction processing mode is set to a slower frequency than in the active mode. In addition, in the cache-transaction processing mode the frequency control module measures the number of cache messages received in a certain period of time. If the number of received cache messages exceeds a threshold, the frequency control module 160 provides information via the FRQ_CTRL signal to change the clock frequency for the processor core 110 in the cache-transaction processing mode. This causes the processor core 110 to consume more power but process the cache message more quickly. Accordingly, by setting the threshold number of cache messages appropriately, the overall power consumption of the processor 102 can be reduced.

Figure 2:
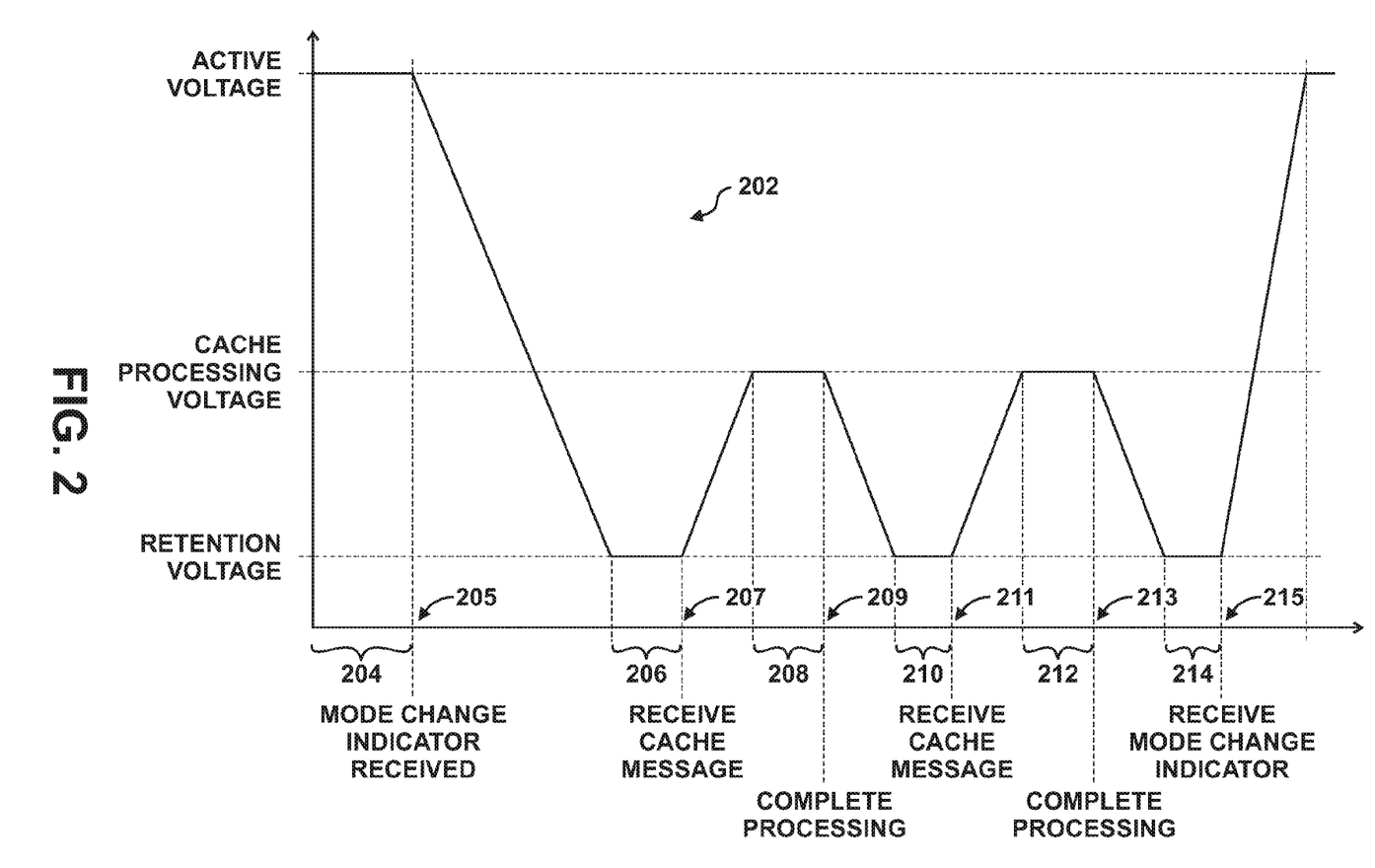
FIG. 2 is a diagram of a particular embodiment of operating voltages provided to the processor of FIG. 1.

Referring to FIG. 2, a diagram depicting an example voltage output 202 for the voltage regulator 130 of FIG. 1 during operation of the system 100 is illustrated. The y-axis of the illustrated diagram indicates the level of the voltage VDD, while the x-axis indicates time. As illustrated, in the time period 204, the processor 102 is in an active mode and the operating voltage VDD is at the active voltage level. At time 205, a mode change indicator is received, indicating that the processor 102 should be placed in the low-power mode. This mode change indicator may be received in response to a user input, the lack of a user input in a predetermined period of time, or other factor. For example, software can cause the mode change indicator to be issued. In another embodiment, software can initiate issuance of the mode change indicator, but the indicator is not issued until an absence of bus activity has been detected for a period of time. In other embodiments, the mode change indicator can be issued in response to the absence of bus activity for a period of time, without software initiation.

In response to the mode change indicator, the voltage VDD is changed to the retention voltage level and the processor 102 enters the low power mode and remains in the low-power mode during time period 206. At time 207, the processor 102 receives a cache message. In response, the processor 102 changes to the cache-transaction processing mode and the voltage level VDD is set to the cache-transaction processing voltage level. The processor 102 remains in the cache-transaction processing mode during the time period 208. In response to completion of processing of the cache message, at time 209, the processor 102 returns to the low-power mode and the voltage VDD provided by the voltage regulator 130 is set to the retention voltage.

The duration of the time period 208 depends on the frequency of the clock of the processor core 110. If the number of cache messages received in a particular amount of time exceeds a threshold, the clock frequency can be adjusted to shorten the time period 208. This increases the amount of power consumed by the processor 102 during the time period 208, but allows the processor 102 to process cache messages more quickly and thus return to the low-power state, at time period 210, more quickly. Accordingly, the threshold number of cache messages can be set to reduce overall power consumption of the processor 102.

At time 211, another cache message is received. In response, the voltage VDD is set to the cache-transaction processing voltage level and the processor 102 enters the cache-transaction processing mode for the time period 212. Upon completion of processing of the cache message at time 213, the processor 102 returns to the low power mode and the voltage VDD is set to the retention voltage level for the time period 214. Thus, the processor 102 can enter the cache-transaction processing mode and return to the low-power mode each time a cache message is received.

At time 215, a mode change indicator is received, indicating that the processor 102 should change to the active mode. The mode change indicator may be received in response to a user input or other factor. For example, a peripheral device may initiate an interrupt that causes the mode change indicator. In another embodiment, the mode change indicator can be received in response to the expiration of a period of time. In response to the mode change indicator, the processor 102 changes to the active mode and the operating voltage VDD is again set to the highest level for the time period 216.

Figure 3:
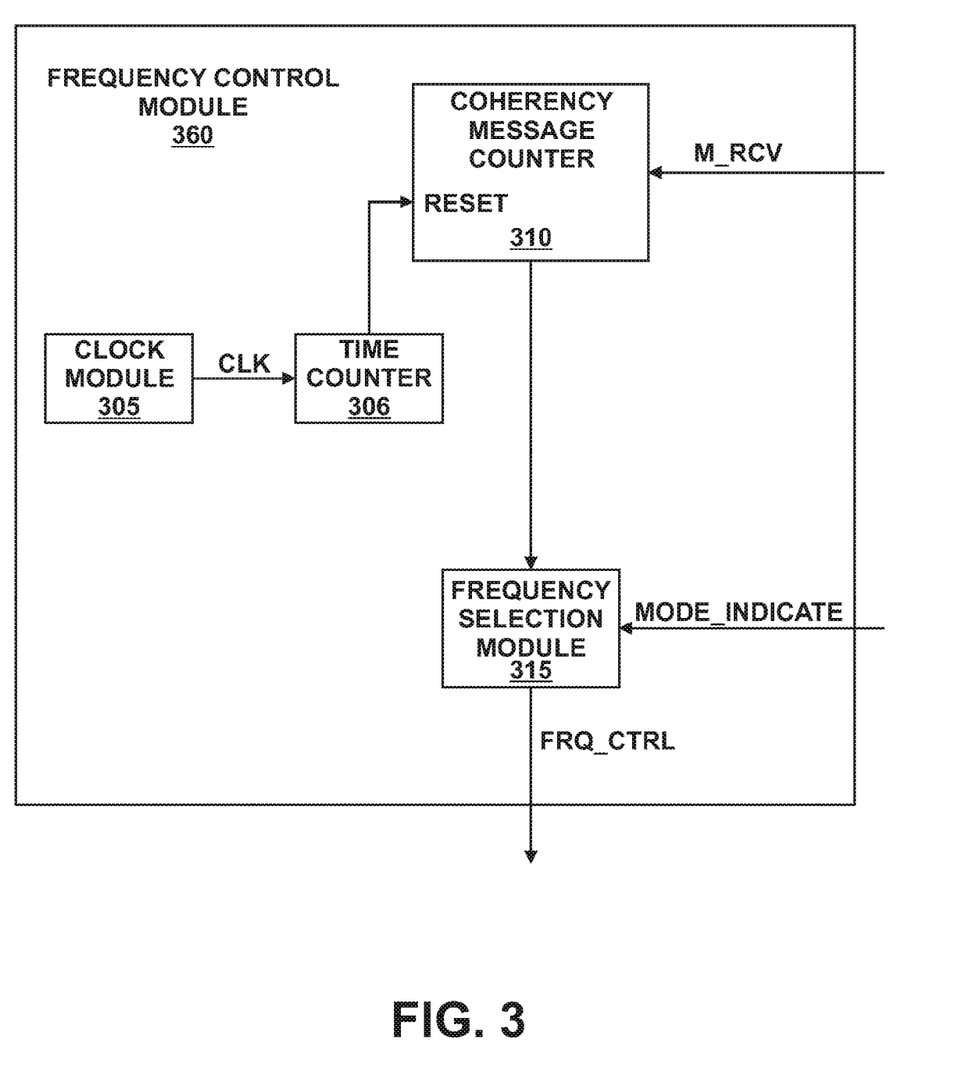
FIG. 3 is a block diagram of a frequency control module of the device of FIG. 1.

Referring to FIG. 3, a block diagram of a particular embodiment of a frequency control module 360, corresponding to the frequency control module 160 of FIG. 1, is illustrated. The frequency control module 360 includes a clock module 305, a time counter 306, a coherency message counter 310, and a frequency selection module 315. The clock module 305 includes an output to provide a clock signal CLK. The time counter 306 includes an input to receive the clock signal CLK and an output. The coherency message counter 310 includes an input, labeled RESET, connected to the output of the time counter 306. The coherency message counter 310 also includes an input to receive the signal M_RCV and an output. The frequency selection module 315 includes an input connected to the output of the coherency message counter 310, an input to receive the MODE_INDICATOR SIGNAL and an output to provide the signal FRQ_CTRL.

During operation, the frequency selection module provides information via the FRQ_CTRL signal to set the clock frequency for the processor core 110 based on the mode of operation indicated by the MODE_INDICATOR signal. Further, when a coherency message is received, the coherency message counter 310 is notified via the signal M_RCV. In response, a value stored by the coherency message counter 310 is adjusted. In addition, the timer counter 306 provides a signal to the RESET input to reset the coherency message counter 310 after a certain period of time, based on the clock signal CLK. In a particular embodiment, the counter 306 is a decrement counter that starts at an initial value and counts down to zero based on transitions of the clock signal CLK. When the counter 306 reaches zero, the signal to reset the coherency message counter is provided. Thus, the value stored by the coherency message counter 310 represents the number of coherency messages received in the period of time. The period of time may be a fixed value or a programmable value. The programmable value may be set based on a BIOS value for the system 100, based on an instruction executed at the processor 102, or otherwise programmed by a user.

If the value stored by the coherency message counter 310 exceeds a threshold before it is reset, indicating that the number of coherency messages received in the set period of time exceeded the threshold, the coherency message counter 310 notifies the frequency selection module 210. In response, the frequency selection module 210 provides information via the signal FRQ_CTRL to change the clock frequency for the processor core 110 when the processor 102 is in the cache-transaction processing mode. Thus, if the number of coherency messages received in a particular period of time exceeds a threshold, the frequency control module 260 adjusts the clock speed for the processor core 110 when the processor 102 is in the cache-transaction processing mode, ensuring that the coherency messages are processed more quickly, thereby allowing the processor 102 to rapidly return to from the cache-transaction process mode to the low-power mode and conserving power.

Figure 4:
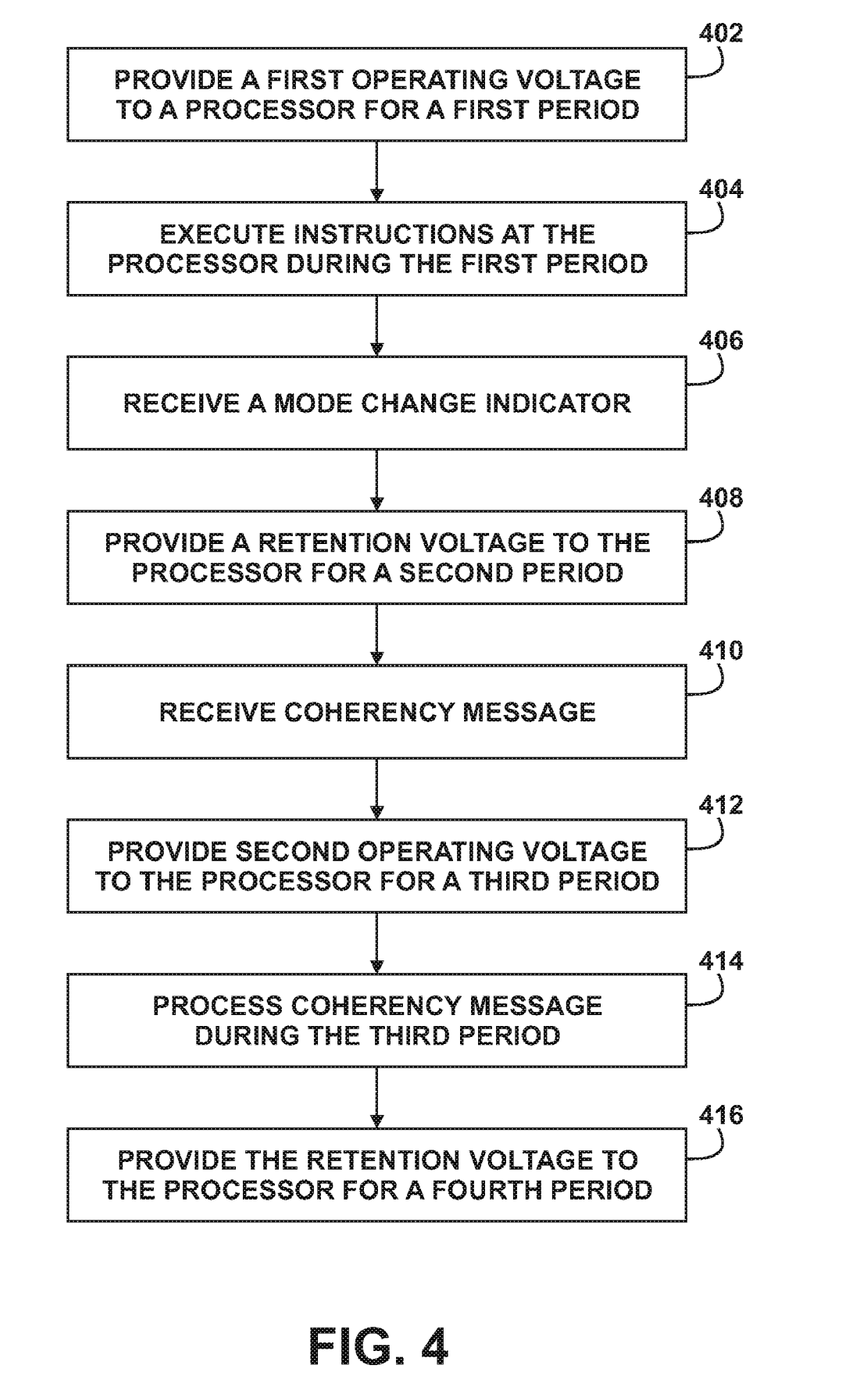
FIG. 4 is a flow diagram of a particular embodiment of a method of configuring an operating mode of a processor.

Referring to FIG. 4, a flow diagram of a particular embodiment of a method of providing voltages to a processor is illustrated. At block 402, a first operating voltage is provided to a processor during a first period, so that the processor is in an active mode. At block 404, instructions are executed at the processor during the first period. At block 406, a mode change indicator is received. In response to the mode change indicator, at block 408 a retention voltage is provided to the processor during a second period of time.

At block 410, a coherency message is received during the second period. In response, at block 412 a second operating voltage is provided to the processor during a third period. At block 414, the coherency message is processed at the processor. At block 416, in response to completion of processing the coherency message, the retention voltage is provided to the processor during a fourth period. Thus, the processor is able to process coherency messages without entering the active mode, thereby allowing the processor to return to the low-power mode more quickly, thus conserving power.

Figure 5:
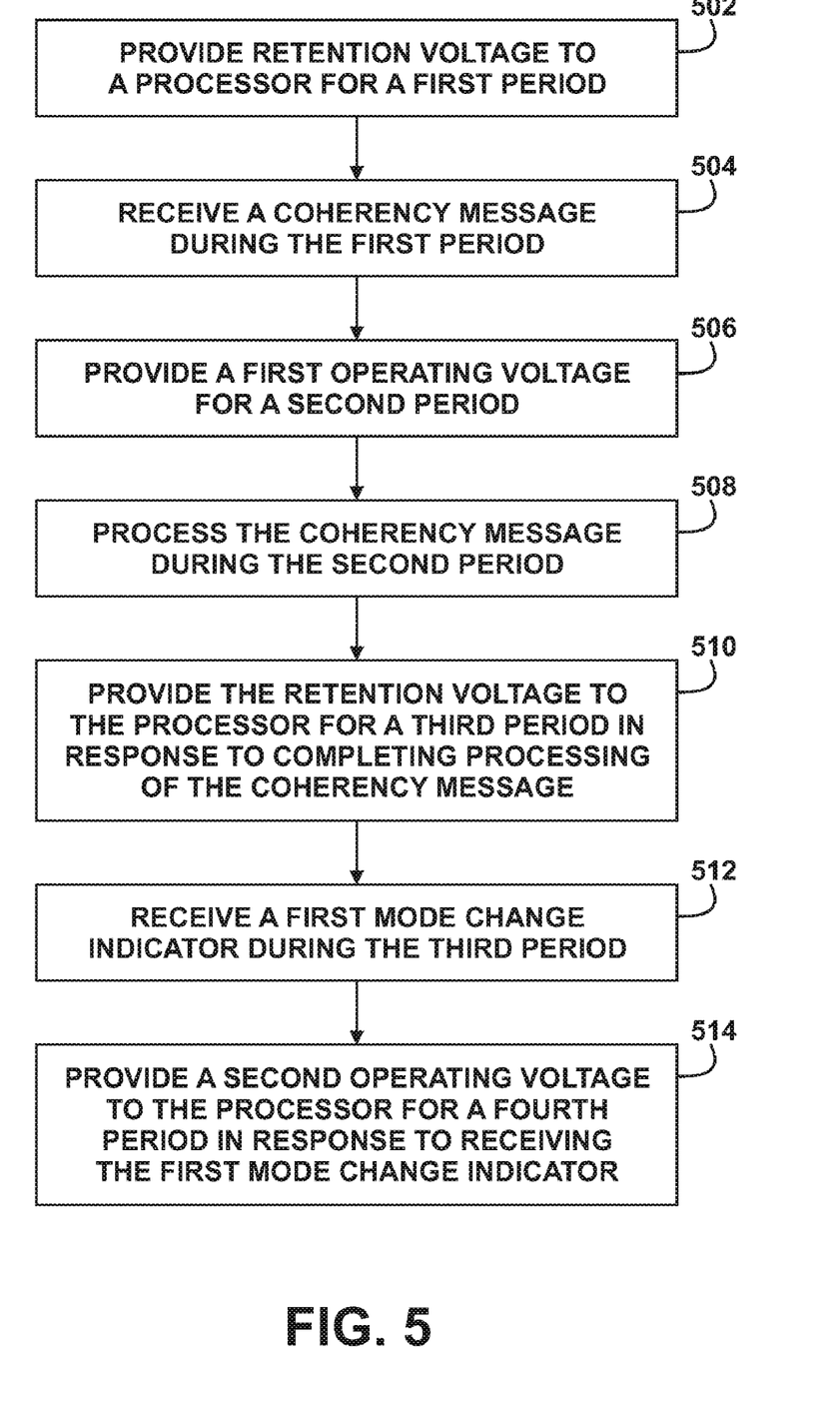
FIG. 5 is a flow diagram of an alternative embodiment of configuring an operating mode of a processor.

Referring to FIG. 5, a flow diagram of an alternative embodiment of a method of providing voltages to a processor is illustrated. At block 502, a processor is in a low power mode during a first period, and therefore a retention voltage is provided to the processor during this period. At block 504, a coherency message is received during the first period, while the processor is in the low-power mode. In response, at block 506 the processor enters the cache-transaction processing mode and a first operating voltage is provided during a second period of time. At block 508, during the second period (i.e. while the processor is in the cache-transaction processing mode) the cache message is processed.

At block 510, in response to completion of processing the cache message, the processor returns to the low power mode and the retention voltage is provided during a third period of time. At block 512, a mode change indicator is received during the third period of time, while the processor is in the low-power mode. In response, at block 514 the processor enters an active mode and a second operating voltage is provided to the processor.

Other embodiments, uses, and advantages of the disclosure will be apparent to those skilled in the art from consideration of the specification and practice of the disclosure disclosed herein. It will further be appreciated that, although some circuit elements and modules are depicted and described as connected to other circuit elements, the illustrated elements may also be coupled via additional circuit elements, such as resistors, capacitors, transistors, and the like. The specification and drawings should be considered exemplary only, and the scope of the disclosure is accordingly intended to be limited only by the following claims and equivalents thereof.

What is claimed is:

1. A method comprising
providing a first operating voltage to a processor for a first period;
executing instructions at the processor for the first period;
in response to receiving a mode change indicator during the first period, providing a retention voltage to the processor during a second period, wherein the processor is in a retention state during the second period, and wherein the retention voltage is lower than the first operating voltage;
in response to receiving a first cache message during the second period, providing a second operating voltage to the processor during a third period, the second operating voltage lower than the first operating voltage and greater than the retention voltage; and
processing the first cache message during the third period.

2. The method of claim 1, wherein the cache message is a cache coherency message.

3. The method of claim 1, further comprising providing the retention voltage to the processor during a fourth period in response to completing processing of the cache message.

4. The method of claim 3, further comprising:
receiving a second cache message during the fourth period; and
providing the second operating voltage during a fifth period in response to receiving the second cache message.

5. The method of claim 1, further comprising:
providing a clock signal having a first frequency to the processor for the first period; and
providing a clock signal having a second clock frequency to the processor for the third period.

6. The method of claim 5, further comprising determining the second frequency based on a number of cache messages received.

7. The method of claim 6, wherein determining the second frequency comprises determining the second frequency based on a number of cache messages received in a first period of time.

8. The method of claim 7, wherein the first period of time is programmable.

9. A method, comprising:
providing a retention voltage to a processor for a first period, wherein the processor is in a retention state during the first period;
receiving a first cache message during the first period;

providing a first operating voltage for a second period in response to receiving the first cache message, the first operating voltage greater than the retention voltage;

processing the first cache message during the second period;

providing the retention voltage to the processor for a third period in response to completing processing of the first cache message;

receiving a first mode change indicator during the third period; and providing a second operating voltage to the processor for a fourth period in response to receiving the first mode change indicator, the second operating voltage greater than the first operating voltage.

10. The method of claim 9, further comprising:

receiving a second mode change indicator during the fourth period; and providing the retention voltage to the processor during a fifth period in response to receiving the fifth mode indicator.

11. The method of claim 10, further comprising:

receiving a second cache message during the fifth period; and providing the first operating voltage to the processor for a sixth period in response to receiving the second cache message.

12. The method of claim 11, further comprising:

processing the second cache message during the sixth period; and providing the retention voltage to the processor for a seventh period in response to completing processing of the second cache message.

13. The method of claim 9, further comprising:

providing a clock signal having a first frequency to the processor for the first period; and providing a clock signal having a second frequency to the processor for the fourth period.

14. The method of claim 13, wherein providing the clock signal at the first frequency comprises:

determining a number of cache messages received in a first period of time;

setting the first frequency based on the number of cache messages received.

15. The method of claim 14, wherein the first period of time is programmable.

16. The method of claim 9, wherein the first cache message is a cache coherency message.

17. A device, comprising:

a processor comprising a processor core and a cache;

a mode control module configured to control a mode of operation of the processor;

a voltage regulator configured to:

set an operating voltage of the processor to a first voltage in response to the mode control module indicating an active mode of the processor;

set the operating voltage of the processor to a second voltage lower than the first voltage in response to the mode control module indicating a low processing mode of the processor, wherein the processor is enabled to process cache messages in the low processing mode; and set the operating voltage to a third voltage in response to the mode control module indicating the processor is in a retention mode, the third voltage lower than the second voltage.

18. The device of claim 17, wherein the mode control module is configured to set the mode of operation to the low processing mode in response to the processor receiving a cache message when the processor is in the retention mode.

19. The device of claim 18, wherein the mode control module is configured to set the mode of operation to the retention mode in response to the processor completing processing of the cache message.

20. The device of claim 17, further comprising a frequency control module configured to set a clock frequency of the processor based on the mode of operation.

* * * * *